United States Patent [19]
Uchihori

[11] Patent Number: 5,426,778
[45] Date of Patent: Jun. 20, 1995

[54] COMPUTER SYSTEM FOR SHIFTING AN OPERATION TIMING THEREOF IN RESPONSE TO A DETECTED ABNORMAL STATES

[75] Inventor: Ikuo Uchihori, Tokyo, Japan

[73] Assignee: Kabushiki Kaisha Toshiba, Kawasaki, Japan

[21] Appl. No.: 347,199

[22] Filed: Nov. 21, 1994

Related U.S. Application Data

[63] Continuation of Ser. No. 729,685, Jul. 15, 1991, abandoned.

[30] Foreign Application Priority Data

Jul. 17, 1990 [JP] Japan ................................. 2-187252

[51] Int. Cl.6 ................................................ G06F 1/08
[52] U.S. Cl. ................................. 395/575; 395/550; 364/268.9; 364/267.7; 364/271.6; 364/DIG. 1; 371/36
[58] Field of Search ............... 395/575, 550, 580, 575; 364/200, 900; 371/36

[56] References Cited

U.S. PATENT DOCUMENTS

| | | | |
|---|---|---|---|
| 3,702,463 | 11/1972 | Lesniewski | 364/200 |
| 4,486,829 | 12/1984 | Mori et al. | 364/200 |
| 4,644,498 | 2/1987 | Bedard et al. | 364/900 |
| 4,651,277 | 3/1987 | Sakaji | 364/200 |
| 4,701,915 | 10/1987 | Kitamura et al. | 371/13 |
| 4,750,177 | 6/1988 | Hendrie et al. | 371/32 |
| 4,835,728 | 5/1989 | Si et al. | 364/900 |
| 5,235,698 | 8/1993 | Lan | 395/550 |
| 5,261,082 | 11/1993 | Ito et al. | 395/550 |
| 5,319,771 | 6/1994 | Takeda | 395/550 |

*Primary Examiner*—Christopher B. Shin
*Attorney, Agent, or Firm*—Oblon, Spivak, McClelland, Maier, & Neustadt

[57] ABSTRACT

A technique for preventing downtime in a redundant computer system having several processors without disconnecting any of the processors from the system. When an abnormality of a processor is detected, a pulse signal which assumes a HIGH value at a predetermined period is supplied to a busy controller of the processor to set the processor in a waiting state. In response to the HIGH value of this signal, the busy controller outputs a busy signal to set the processor in a waiting state and shifts an execution timing of data processing of the processor from that of a normal state, thereby preventing recurrence of the abnormality.

3 Claims, 6 Drawing Sheets

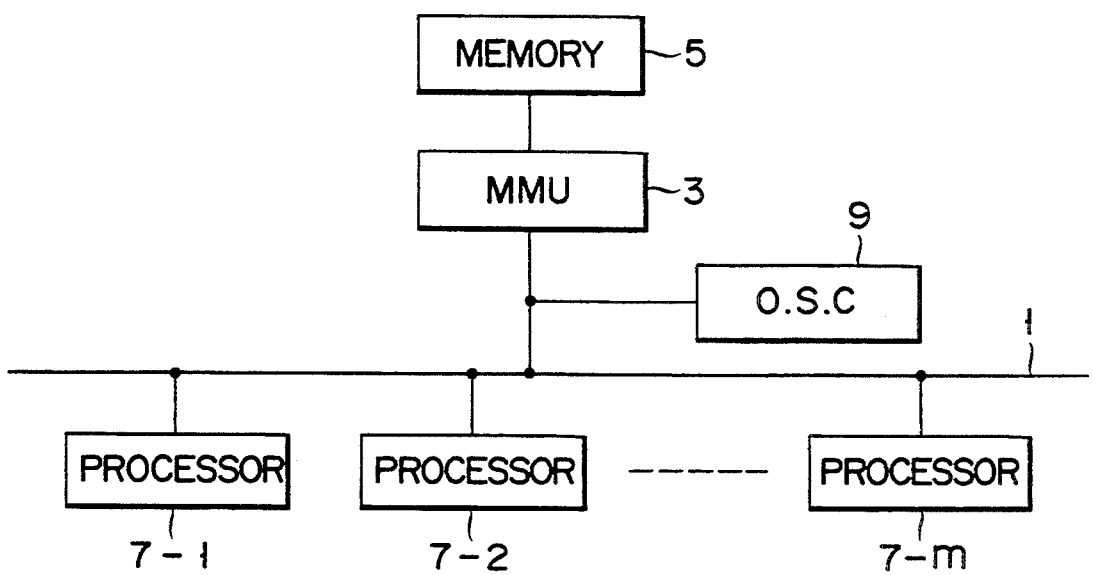
F I G. 1

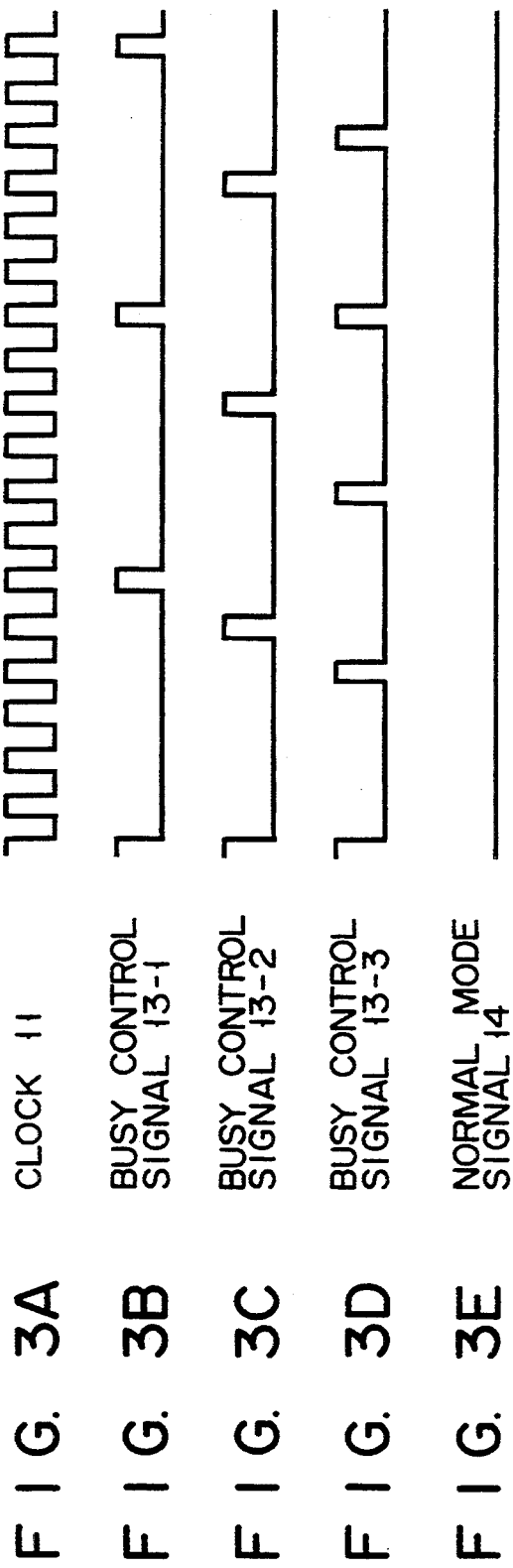
FIG. 3A CLOCK 11
FIG. 3B BUSY CONTROL SIGNAL 13-1
FIG. 3C BUSY CONTROL SIGNAL 13-2
FIG. 3D BUSY CONTROL SIGNAL 13-3
FIG. 3E NORMAL MODE SIGNAL 14
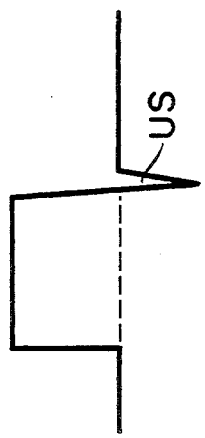
FIG. 4

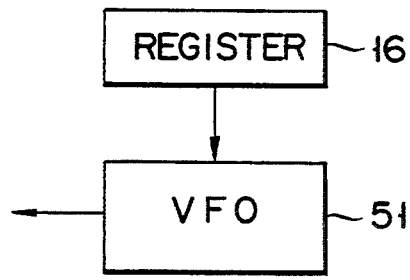
F I G. 6
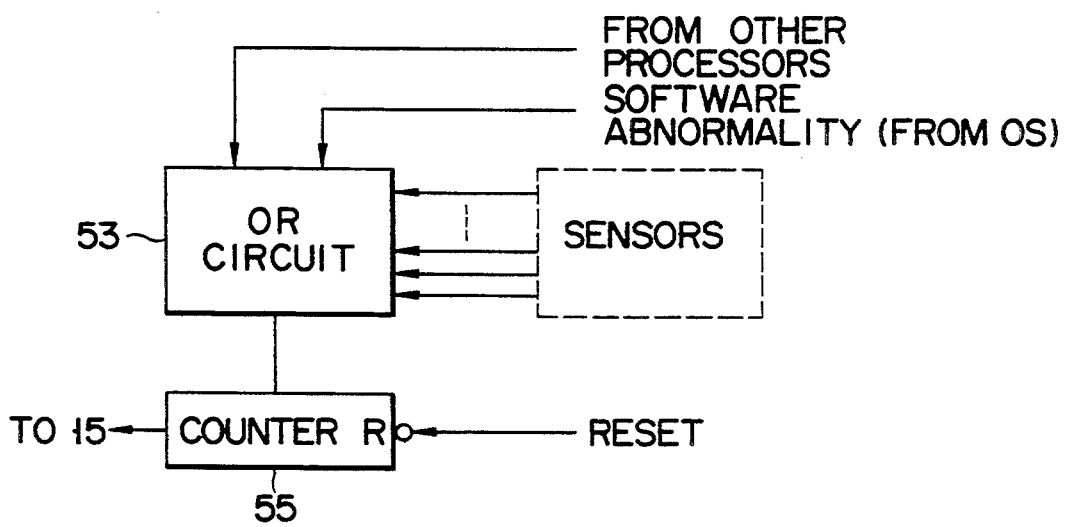
F I G. 7
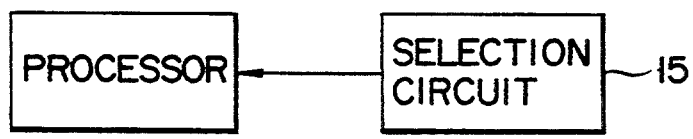
F I G. 8

COMPUTER SYSTEM FOR SHIFTING AN OPERATION TIMING THEREOF IN RESPONSE TO A DETECTED ABNORMAL STATES

This is a continuation of application Ser. No. 07/729,685, filed on Jul. 15, 1991, now abandoned.

BACKGROUND OF THE INVENTION

1. Field of the Invention

The present invention relates to a computer system having high reliability (i.e., having a low probability of system down).

The present invention relates to a technique of preventing, in a redundant computer system including a plurality of processors, the processors from being disconnected from the system.

The present invention relates to a technique of varying an execution timing of an internal operation of a computer.

2. Description of the Related Art

There is a known technique of constituting a computer system using a plurality of computers in order to improve reliability of the computer system. In a system of this type, generally, one computer operates and others wait. If the operating computer fails, one of the waiting computers takes over the processing. In this system, however, a temporary down of the system during switching between the computers cannot be avoided.

A computer system called an FTC (Fault Tolerant Computer) which lays special emphasis on eliminating down time has attracted attention. Although various methods of achieving no down time are available, the following method is generally used. That is, a plurality of processors perform the same processing in a system. Processing results of the processors are compared with each other, and an abnormality is detected in accordance with the comparison result. A processor detected to be abnormal is disconnected from the system, and the processing is continued by the remaining processors.

Even in a system using computers of this type, however, if an abnormality is caused by a design defect of a computer or a program bug, a plurality of processors may be disconnected by a chain reaction from the system. More specifically, system abnormality caused by a design defect of a processor or a software bug occurs, in many cases, only when a series of, e.g., input data or operation timings take a specific relationship. In a redundant system, as described above, a plurality of processors often process the same input data in accordance with the same software and the same clock, or a processor often takes over processing of a faulty processor. In these cases, a plurality of processors may be set in the same specific state by, e.g., a design defect or a software bug to cause the system to go down. Especially in a system using custom-designed processors or software, such a design defect or software bug sometimes poses serious problems in the early stages after development.

SUMMARY OF THE INVENTION

The present invention has been made in consideration of the above situation and has as its object to provide a highly reliable computer system. It is another object of the present invention to provide a computer system capable of preventing recurrence of an abnormality of a computer caused by a design defect or the like.

In order to achieve the above objects of the present invention, a computer system according to the present invention includes a processor comprising data processing means for processing data, abnormality detecting means for detecting an abnormality of said processor, and waiting state setting means for setting said data processing means in a waiting state in response to a detection result from said abnormality detecting means when an abnormality of said processor is detected.

In the above arrangement, when an abnormality of a processor is detected, an execution timing of internal basic processing of the processor is shifted from a standard timing. As a result, recurrence of a malfunction caused at a specific operation timing by, e.g., a fault, noise, or a bug can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an arrangement of a computer system according to an embodiment of the present invention;

FIGS. 3A to 3E are timing charts showing signal waveforms of a clock signal, busy control signals, and a normal mode signal;

FIG. 4 is a view for explaining an undershoot generated in a digital circuit;

FIG. 6 is a block diagram showing another example of an arrangement for generating a busy state;

FIG. 7 is a block diagram showing another arrangement for performing mode setting;

FIG. 8 is a block diagram showing an embodiment for changing a clock to be supplied to a processor.

DETAILED DESCRIPTION OF THE PREFERRED EMBODIMENTS

Figure 2:
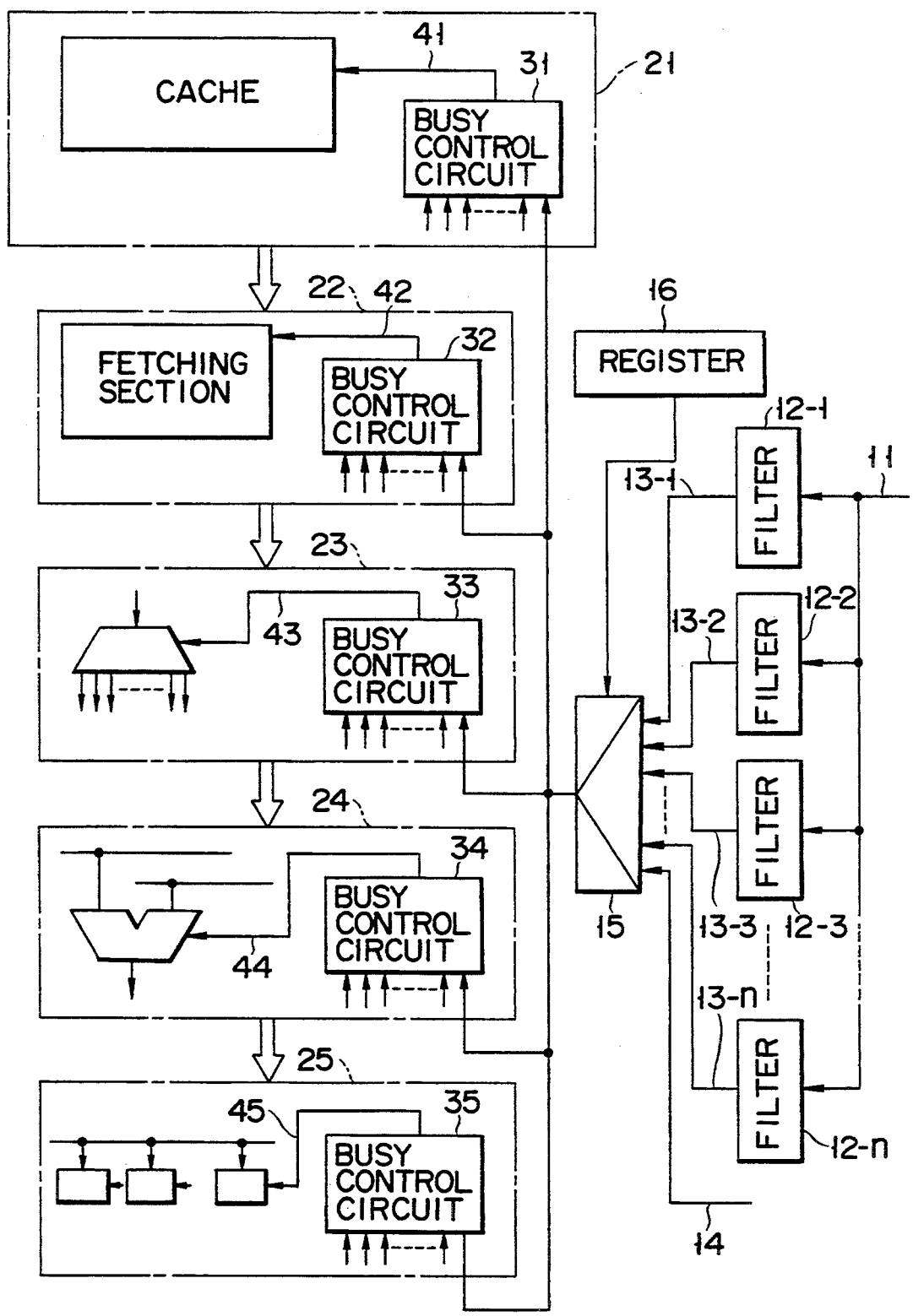
FIG. 2 is a block diagram showing an internal arrangement of a processor of the computer system shown in FIG. 1.

The first embodiment of the present invention will be described below with reference to the accompanying drawings.

The first embodiment will be briefly described first.

A cause of system down of a redundant computer system constituted by a plurality of processors (computers) is, in many cases, a single abnormality in a basic operation. A cause of this single abnormality in a basic operation is, e.g., a fault, noise, or a bug. In many cases, however, this abnormality occurs, regardless of its cause, only when a specific timing relationship is established. For example, an undershoot US shown in FIG.

4 generated at a certain node sometimes causes a malfunction of a processor when certain specific operation conditions are established although it has no effect on an operation of a processor in a normal state. Since pipeline control is generally performed in recent years, there is a high possibility that a system abnormality is caused by a problem in operation timings.

Recurrence of such a malfunction can be prevented by shifting an execution timing of each basic operation of hardware from a normal timing or shifting an execution timing between basic operations from normal timing. For example, if an operation of a processor is temporarily stopped during, before, or after a period in which the undershoot shown in FIG. 4 occurs, there is a high possibility that no malfunction occurs.

In this first embodiment, therefore, a "waiting state" is generated in a pipeline at a predetermined period to shift an execution timing of each basic operation of hardware from a standard timing.

The first embodiment of the present invention will be described below with reference to the accompanying drawings. In the first embodiment, the present invention is applied to a computer system constituted by a plurality of processors for performing four-stage pipeline processing.

FIG. 1 shows a basic arrangement of a computer system according to this embodiment. The computer system shown in FIG. 1 comprises a bus 1, a memory management unit 3 connected to the bus 1, a memory 5 connected to the memory management unit 3, a plurality of processors 7-1 to 7-m sharing the memory 5, and an oscillator 9 for supplying an operation clock to the processors 7.

FIG. 2 is a block diagram showing a characteristic portion of each processor 7. Referring to FIG. 2, reference numeral 11 denotes a clock signal supplied from the oscillator 9 to obtain synchronization in the processor. Although this clock signal need not be a system clock, a system clock output from the oscillator 9 is used as the clock 11 in this embodiment. Reference numerals 12-1, 12-2, 12-3 . . . , 12-n denote filters (busy signal generators) for receiving the clock signal 11. The filters 12-1, 12-2, 12-3, . . . 12-n, each of which is constituted by a gate array or the like, perform specific filtering (frequency division) for the input clock signal 11 to generate busy control signals 13-1, 13-2, 13-3, . . . , 13-n, respectively, which go to level HIGH at different periods. Reference numeral 14 denotes a normal mode signal which is constantly at level LOW and used in a normal state.

The periods of the busy control signals 13-1, 13-2, 13-3, . . . , 13-n are shortened in the order named from the signal 13-1 having the longest period to the signal 13-n having the shortest period. FIGS. 3A to 3E show examples of signal waveforms of the busy control signals 13-1, 13-2, and 13-3 in comparison with those of the clock signal 11 and the normal mode signal 14.

Referring back to FIG. 2, reference numeral 15 denotes a selector for selecting one of the busy control signals 13-1 to 13-n output from the filters 12-1 to 12-n and the normal mode signal 14; and 16, a register in which information (selection designation information) for designating a signal to be selected with respect to the selector 15 is set. The register 16 is connected to the bus 1 via an input buffer (not shown) and can be rewritten by another processor 7.

Reference numeral 21 denotes an instruction cache unit for storing a copy of (part of) instruction words stored in the main memory 5; 22, an instruction fetching unit as an instruction fetching stage of a pipeline, for fetching an instruction word from the instruction cache unit 21 into the pipeline; 23, a decoding unit as a decoding stage of the pipeline, for decoding the instruction word; 24, an executing unit as an executing stage of the pipeline, for executing an arithmetic operation designated by the instruction word; and 25, a write-back unit as a write-back stage of the pipeline, for storing the arithmetic operation result in a designated location.

Reference numerals 31 to 35 denote busy controllers in the units 21 to 25, respectively, which constitute a pipeline. Each of the busy control circuits 31 to 35 generates a corresponding one of busy signals 41 to 45 against pipeline hazard caused by various factors to cause subsequent processing of the corresponding unit to wait (i.e., to set the processing in a waiting state). The busy control circuits 31 to 35 receive an output signal from the selector 15 as one busy control condition in addition to other signals. When the output signal from the selector 15 is at level HIGH, each of the busy control circuits 31 to 35 unconditionally generates a corresponding one of the busy signals 41 to 45 to stop an operation of the corresponding stage (i.e., to set the operation in the waiting state).

An operation of the computer system having the arrangements shown in FIGS. 1 and 2 will be described below.

During normal system operation, information indicating a normal state (normal mode) for designating selection of the normal mode signal 14 is set in the register 16 of each processor, and the main memory 5 holds a copy of a value of the register 16 of each processor 7.

When the information indicating a normal state is set in the register 16, the selector 15 selects the normal mode signal 14 from the busy control signals 13-1 to 13-n and the normal mode signal 14. The normal mode signal 14 selected by the selector 15 is supplied to the busy control circuits 31 to 35 in the units 21 to 25 constituting a pipeline. Since the selected normal mode signal is constantly at level LOW, none of the busy signals 41 to 45 is generated by this input signal. Therefore, the units 21 to 25 constituting a pipeline continuously operate as long as no other cause is present.

Assume that a hardware or software abnormality is detected in processor 7-1 during an operation of the computer system having the above arrangement. The normal state and an abnormality of the system can be detected by means of well-known techniques such as, for example, parity checking. A detailed description of such well-known techniques will be omitted herefrom. Information indicating the first abnormality level for designating selection of the busy control signal 13-1 is set by hardware or software in the register 16 of the processor 7-1 detected to be abnormal.

Examples of a method of rewriting stored information in the register 16 will be described in detail below. In the system shown in FIG. 1, each processor 7 normally outputs an on-line signal indicating that the processor is connected to the bus and to other processors. Each processor 7 switches off this on-line signal upon detecting an abnormality of the processor 7 by hardware or software. Therefore, each processor 7 can check the presence of an abnormality in other processors 7 by checking their on-line signals. When the processor 7-1 switches off the on-line signal and the processor 7-2 detects this switching, for example, the processor 7-2 checks the main memory 5 and detects that the value of the register 16 of the processor 7-1 indicates a normal state. The processor 7-2 sets information indicating the first abnormality level in the register 16 and rewrites corresponding data of the main memory 5. When the system is arranged to notify an operator of a processor abnormality, the operator may perform data rewriting for the register 16.

When the information indicating the first abnormality level is set in the register 16, the selector 15 selects the busy control signal 13-1 having the longest period from the busy control signals 13-1 to 13-n and the normal mode signal 14. That is, the selector 15 periodically outputs a HIGH signal. The busy controllers 31 to 35 in the units 21 to 25 constituting a pipeline generate busy signals 41 to 45 in synchronism with the periodic HIGH signal (busy control signal 13-1) supplied from the selector 15. For this reason, the units 21 to 25 constituting a pipeline of an abnormal processor are sometimes set in a waiting state, and execution timings of their respective basic operations are shifted from those in a normal state accordingly. Therefore, although an apparent operation of the processor remains the same as that performed when a hardware abnormality occurs, its internal operation is different from that performed in a normal state. As a result, since recurrence of many hardware defects (including faults) can be prevented as described above, the processor can be returned to the system.

If recurrence of the hardware defect of the processor cannot be prevented by the above operation or a hardware abnormality caused by another factor is detected in the processor, information indicating the second abnormality level is set in the register 16 of the processor following the same procedures as described above. In accordance with this information indicating the second abnormality level, the selector 15 selects the busy control signal 13-2 having the second longest period next to that of the busy control signal 13-1. The selected signal 13-2 is used in busy control at the second abnormality level performed by the busy controllers 31 to 35 in the respective units 21 to 25 of the pipeline.

If recurrence of the hardware defect of the processor cannot be prevented by this busy control at the second abnormality level or a hardware abnormality caused by another factor is detected, busy control is performed at the third abnormality level according to the busy control signal 13-3. If a hardware abnormality is similarly detected even at the nth abnormality level according to the busy control signal 13-n having the shortest period, return of the processor to the system is not performed, but the processor finally detected to be abnormal is disconnected from the system.

While a processor operates at an abnormal level, performance of the processor is reduced from its normal level. However, performance reduction in a system as a whole including this processor is smaller than that obtained when the processor is immediately disconnected therefrom, and down time of the system can also be reduced. In general, when a processor is to be disconnected from a system, another processor takes over processing currently being executed by the processor to be disconnected. In a conventional system, however, if an abnormality is caused by a hardware bug, the entire system goes down because processors which take over processing fail by the same cause and are disconnected from the system by a chain reaction. In this embodiment, however, since there is high possibility that defects including a hardware bug are saved by shifting operation timings as described above especially in this situation, the down time is largely reduced.

Figure 5:
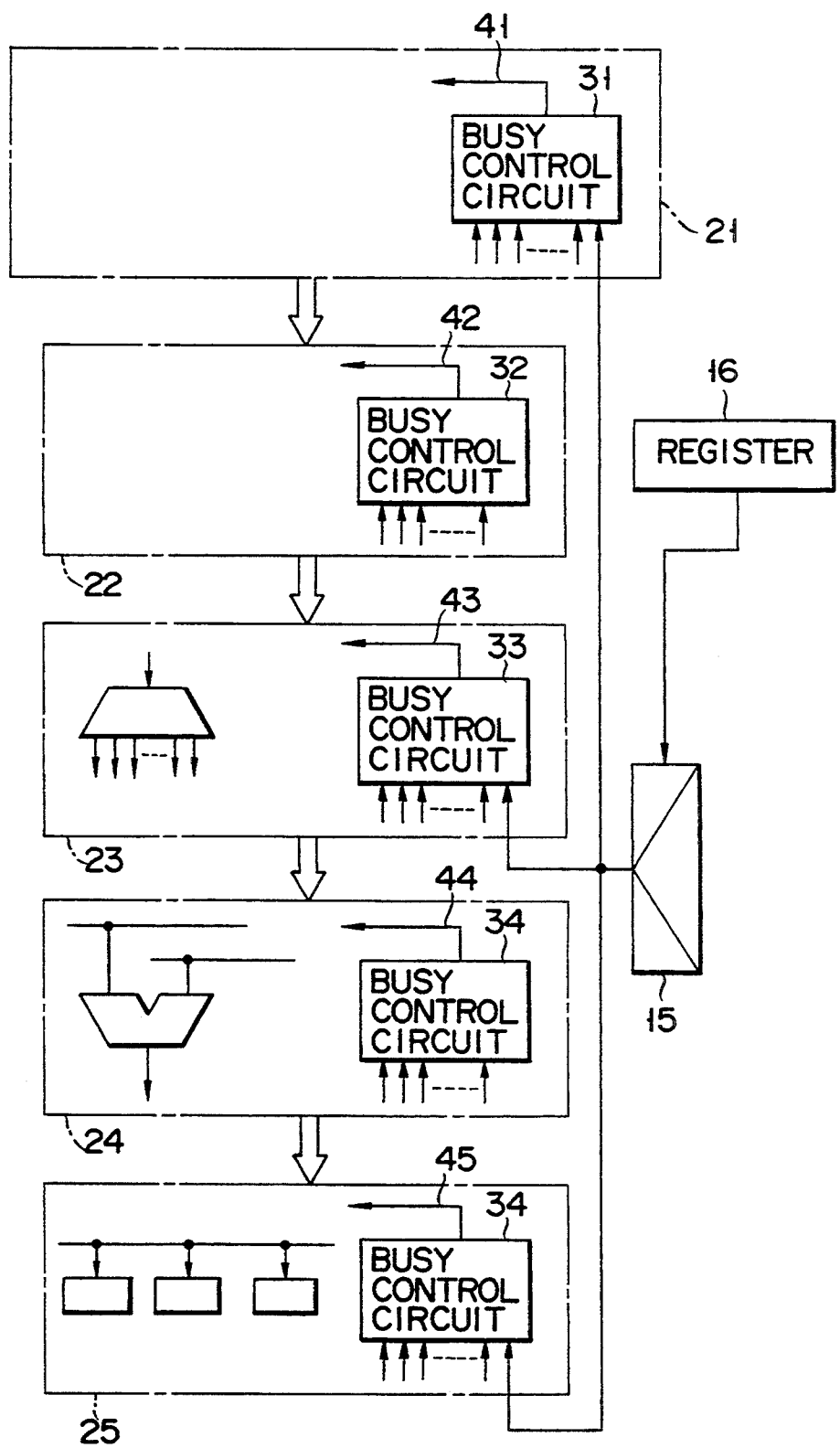
FIG. 5 is a block diagram showing a modification of an arrangement of the processor shown in FIG. 2.

In the above embodiment, the units constituting a pipeline are simultaneously set in a busy state (waiting state) in accordance with an output from the selector 15. However, the present invention is not limited to the above embodiment. For example, as shown in FIG. 5, only operations of some of a plurality of units constituting a pipeline may be set in a busy state. This arrangement is more effective than the above embodiment because operation timings between the respective units are also shifted.

In the above embodiment, the externally supplied clock signal 11 is processed by the filter and the selector to supply a signal which periodically goes to level HIGH to a pipeline. However, the present invention is not limited to the above embodiment. For example, as shown in FIG. 6, a variable frequency oscillator 51 which varies its oscillation frequency in accordance with the set value of the register 16 may be used in place of the clock signal 11, the busy signal generator 13, and the selector 15.

In addition, in the above embodiment, a processor except for a processor detected to be abnormal or an operator rewrites the contents of the register 16 of the abnormal processor. However, the present invention is not limited to the above embodiment. For example, an arrangement as shown in FIG. 7 may be used. Referring to FIG. 7, an OR circuit 53 ORs an output from a hardware sensor for detecting an abnormality in a processor, a signal indicating a software abnormality, and signals from other processors, and an output from the OR gate 53 is supplied to a counter 55. A count value of the counter 55 is supplied to the selector 15 instead of an output from the register 16.

When the OR gate 53 receives a signal indicating an abnormality, the count value of the counter 55 is incremented by "1" to update the abnormality level. When a power source is switched on or a reset signal is supplied from an external switch, the count value of the counter 55 is cleared to be "0" to set a normal state. With this arrangement, when an abnormality which can be internally detected by a processor occurs, a pipeline can be set in a busy state without waiting for instructions from other external processors.

The above embodiment is described by taking a processor for performing a pipeline operation as an example, but the present invention is not limited to the above embodiment. For example, as shown in FIG. 8, a clock to be supplied to a processor not performing a pipeline operation may be changed.

Figure 9:
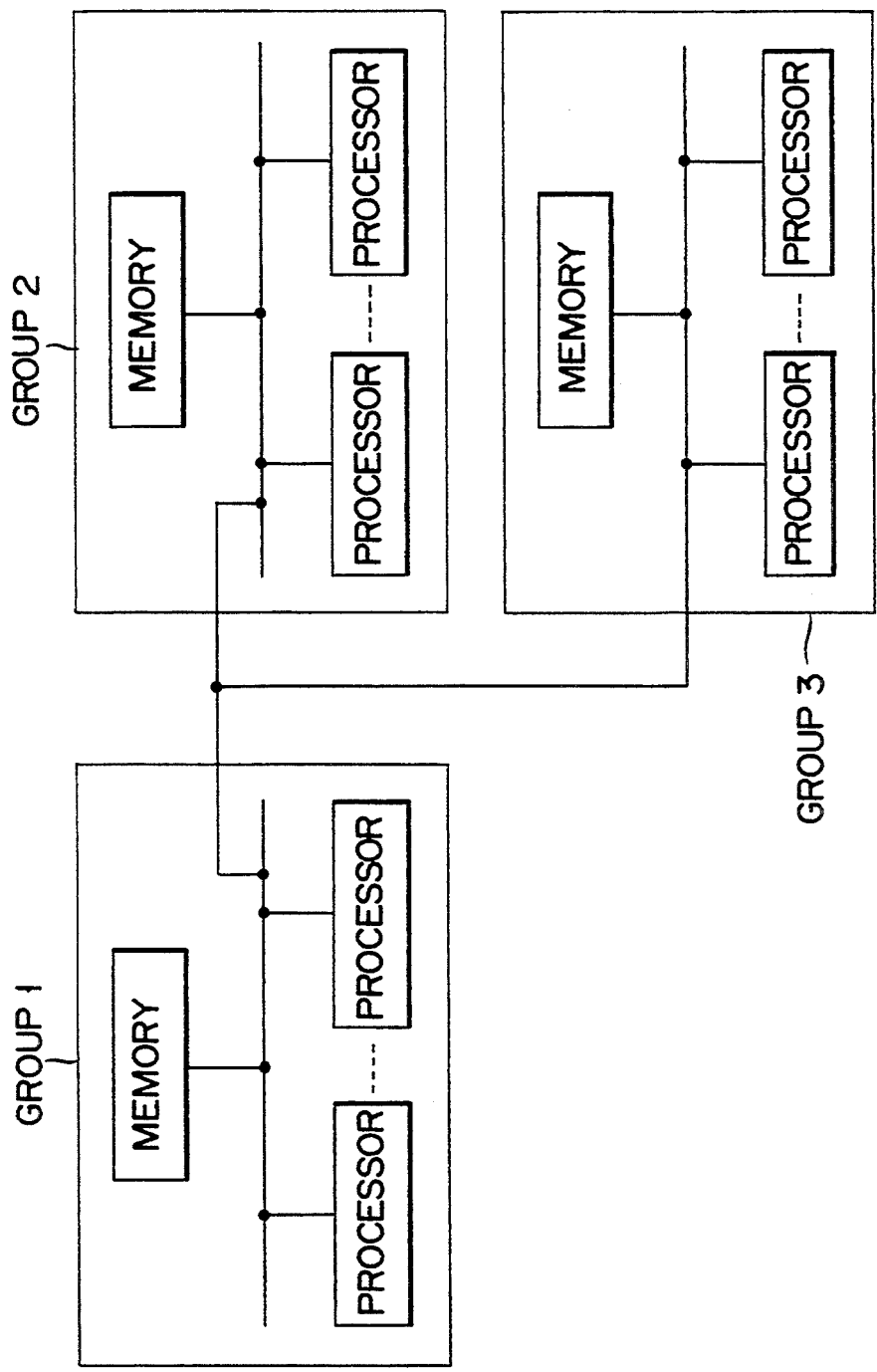
FIG. 9 is a block diagram showing an arrangement of a computer system in which switching is performed in units of groups.

In the above embodiment, the busy control is performed in only a processor detected to be abnormal. However, there is a redundant computer system constituted by several groups each having a plurality of processors, as shown in FIG. 9, in which processing is taken over in units of groups and processors in one group perform the same processing. In such a system, the above busy control may be performed in all of processors in a group including a processor detected to be abnormal.

In the above embodiment, when a processor abnormality is detected, the busy control is performed stepwise from the first abnormality level until the abnormality is canceled. However, the present invention is not limited to the above embodiment. For example, only one busy control signal having a predetermined period may be prepared to perform one-level busy control. In addition, although the above embodiment is described by taking a redundant computer system constituted by a plurality of processors as an example, the present invention can be similarly applied to a computer system constituted by a single processor.

According to the present invention as has been described in detail above, when an abnormality occurs in a computer (processor), execution timings of internal basic operations of the computer are shifted from normal timings. As a result, recurrence of a computer abnormality caused by, e.g., a design defect or a software error can be prevented in many cases. Therefore, since an abnormal computer need not be disconnected from a system but can be returned thereto, down time of the system can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:
   a plurality of data processing means for processing data, each one of said plurality of data processing means being controlled in accordance with a respective operation timing signal and comprising a plurality of control means;
   first signal generating means for generating a plurality of first signals each of which assumes first and second logical values and alternates between said first and second logical values at a respective frequency, said first signals representing an abnormal state of said computer system;
   second signal generating means for generating a second signal which only assumes a third logical value representing a normal state of said computer system;
   selecting means for receiving said first and second signals and selecting one of said first and second signals; and
   selecting designating means for generating a selection signal which designates said one of said first and second signals to be selected by said selecting means in response to a detected normal or abnormal states of at least one of said data processing means, and supplying said selection signal to said selecting means, wherein each plurality of control means corresponding to one of said data processing means generates a busy signal and shifts a respective operation timing signal upon receipt of one of said first signals output from said selecting means, and wherein each plurality of control means corresponding to one of said data processing means maintains a respective operation timing signal upon receipt of said second signal output from said selecting means.

2. A computer system according to claim 1, wherein said selection signal designates said second signal to be supplied to each plurality of control means when said computer system is operating in a normal state, and designates said one of said first signals to be supplied to each plurality of control means when an abnormality occurs in an operation of said computer system.

3. A computer system according to claim 1, wherein when an abnormality in an operation of any of said data processing means is not remedied upon a shifting of respective operation timing signals via designation of said one of said first signals, said selection designating means designates another of said first signals which alternates between said first and second logical values at a frequency higher than that of a currently selected one of said first signals.

* * * * *